United States Patent [19]
Huff et al.

[11] Patent Number: 6,000,367
[45] Date of Patent: Dec. 14, 1999

[54] METHOD OF COMPENSATING FOR BOIL-OFF ALCOHOL IN A FLEXIBLE FUELED VEHICLE WITHOUT A PCV SOLENOID

[75] Inventors: Shean P. Huff; Zhong Li, both of Ann Arbor, Mich.

[73] Assignee: DimlerChrysler Corporation, Auburn Hills, Mich.

[21] Appl. No.: 09/252,406

[22] Filed: Feb. 18, 1999

Related U.S. Application Data

[63] Continuation-in-part of application No. 08/959,696, Oct. 29, 1997, Pat. No. 5,915,342.

[51] Int. Cl.$^6$ ....................................................... F02B 75/12
[52] U.S. Cl. .......................... 123/1 A; 123/681; 123/683; 123/686
[58] Field of Search ..................................... 123/1 A, 681, 123/683, 684, 686, 689, 494

[56] References Cited

U.S. PATENT DOCUMENTS

| | | |
|---|---|---|
| 4,936,278 | 6/1990 | Umeda . |
| 5,255,611 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,435,285 | 7/1995 | Adams et al. . |
| 5,467,755 | 11/1995 | Konrad et al. . |
| 5,497,753 | 3/1996 | Kopera . |
| 5,520,162 | 5/1996 | Rotramel et al. . |
| 5,613,480 | 3/1997 | Katch et al. . |
| 5,730,112 | 3/1998 | Jeong . |
| 5,850,824 | 12/1998 | Seitz et al. ............................ 123/688 |
| 5,868,117 | 2/1999 | Moote et al. ......................... 123/486 |
| 5,881,703 | 3/1999 | Nankee, II et al. .................. 123/686 |

*Primary Examiner*—John Kwon
*Attorney, Agent, or Firm*—Mark P. Calcaterra

[57] ABSTRACT

A method is provided for controlling the combustion parameters of an internal combustion engine without a PCV solenoid during a boil-off condition. The methodology records the temperature of the engine when the vehicle is turned off. When the vehicle is restarted, the methodology determines the amount the engine has cooled since it was shut down. Based on the difference in engine temperature and the current engine temperature, the methodology determines the amount of boil-off corruption remaining. The methodology then determines a new boil-off corruption fuel multiplier based on the amount of boil-off corruption remaining. The new boil-off corruption fuel multiplier is used to modify fuel control until the boil-off condition ceases.

19 Claims, 3 Drawing Sheets

METHOD OF COMPENSATING FOR BOIL-OFF ALCOHOL IN A FLEXIBLE FUELED VEHICLE WITHOUT A PCV SOLENOID

CROSS-REFERENCE TO RELATED APPLICATIONS

This application is a continuation-in-part of U.S. application Ser. No. 08/959,696, filed Oct. 29, 1997 now U.S. Pat. No. 5,915,342.

BACKGROUND OF THE INVENTION

1. Technical Field

The present invention relates generally to fuel control systems and, more particularly, to a method of compensating for boil-off corruption in a motor vehicle capable of operating on more than one type of fuel.

2. Discussion

Environmental and energy concerns have stimulated the development of alternative transportation fuels for use in automobiles. A flexible fueled vehicle is capable of operating on gasoline, alcohol, or any mixture of the two. Alcohol fuels include methanol and ethanol. When operating on different fuels, modifications to the engine are necessary because of the different characteristics of each fuel. For example, an engine operating on 85% ethanol (a blend of 85% ethanol and 15% gasoline) requires approximately 1.4 times the amount of fuel as compared to 100% gasoline. This is due to the lower energy content of the ethanol.

The ideal air to fuel ratio in an internal combustion engine is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Since alcohol fuels require a lower air/fuel ratio than pure gasoline at stoichiometric, the engine must be compensated for in the rich direction. The amount of compensation increases as the percentage of alcohol in the fuel increases.

Maintaining stoichiometric operation in a flexible fueled vehicle is made even more difficult since such vehicles experience a condition referred to in the art as "boil-off". That is, when cold starting a vehicle that is fueled with alcohol in cold ambient conditions, some of the injected fuel remains in a liquid state. This liquid fuel often accumulates in the engine oil. When the oil temperature reaches the boiling point of the alcohol, the alcohol within the oil begins to vaporize. After vaporization, the alcohol is introduced into the engine through the crank case ventilation system. These additional vapors in the engine can cause a high level of rich fuel corruption until all of the alcohol in the oil is burned off.

U.S. Pat. No. 5,520,162, entitled "Boil-off for a Flexible Fuel Compensation System", hereby expressly incorporated by a reference, provides a flexible fuel compensation system including a method of methanol-type boil-off compensation. The methanol boil-off compensation method includes an initialization routine, a run mode routine and a shut-down routine. According to the method, a plurality of flags are monitored to determine when the methanol boil-off compensation should be used. Although this and other prior art methods are effective for their particular applications, there is room for improvement in the art.

For instance, previously, there was no provision for allowing the percent alcohol content learning system of the motor vehicle to function without being corrupted by the temporary introduction of alcohol vapors into the engine. This corruption causes the fuel composition multiplier of the percent alcohol content system to be frozen at a potentially incorrect value. This may result in drivability deficiencies after the boil-off condition ceases. Also, if the fuel composition multiplier is determined before the boil-off condition occurs, no technique is provided to compensate for the additional alcohol introduced into the engine during the boil-off period. This may also result in drivability deficiencies. Finally, if the vehicle is shut down during a boil-off condition, no compensation is made for the boil-off condition of the engine when it is restarted.

In view of the foregoing, it would be desirable to provide a temporary fuel composition multiplier for low and high air-flows in the engine. Such a temporary fuel composition multiplier would yield additional fuel control during a boil-off condition. Also, the pre-boil-off fuel composition multiplier value could be saved for post-boil-off use. Further, the temporary fuel composition multiplier could be saved when the vehicle is shut down during a boil-off condition and re-used after the vehicle is restarted.

SUMMARY OF THE INVENTION

It is, therefore, one object of the present invention to provide a system of flexible fuel compensation.

It is another object of the present invention to provide a flexible fueled compensation system which determines if a boil-off condition will occur during the present vehicle operation.

It is yet another object of the present invention to provide a flexible fuel compensation system that avoids corrupting the fuel composition multiplier of a percent alcohol content learning system during alcohol content learning.

It is still another object of the present invention to provide a flexible fuel compensation system that compensates for different levels of boil-off corruption at high and low air-flows.

It is still yet another object of the present invention to provide a flexible fuel compensation system that allows for enhanced fuel control during a boil-off condition when the fuel composition multiplier of a percent alcohol content learning system was previously learned.

It is also an object of the present invention to provide a flexible fuel compensation system that determines when a boil-off condition is complete.

It is another object of the present invention to provide a flexible fuel compensation system that calculates a new boil-off corruption fuel multiplier after an engine restart event.

The above and other objects are provided by a method of compensating for boil-off alcohol in a flexible fueled vehicle without a PCV solenoid. The methodology detects a boil-off condition and updates an inferred ethanol content accordingly. The compensation is correlated with engine air-flow to account for high or low levels of boil-off corruption. The methodology also determines when a boil-off condition has ceased and returns engine combustion parameters to a non boil-off operating mode.

The methodology also records the temperature of the engine and the value of the boil-off corruption fuel multiplier when the vehicle is turned off. When the vehicle is restarted, the methodology determines the amount the engine has cooled since it was shut down. Based on the difference in engine temperature and the current engine temperature, the methodology determines the amount of boil-off corruption remaining. The methodology then determines a new boil-off corruption fuel multiplier based on the amount of remaining boil-off corruption. The new boil-off corruption fuel multiplier is then used to modify fuel control until the boil-off condition ceases.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
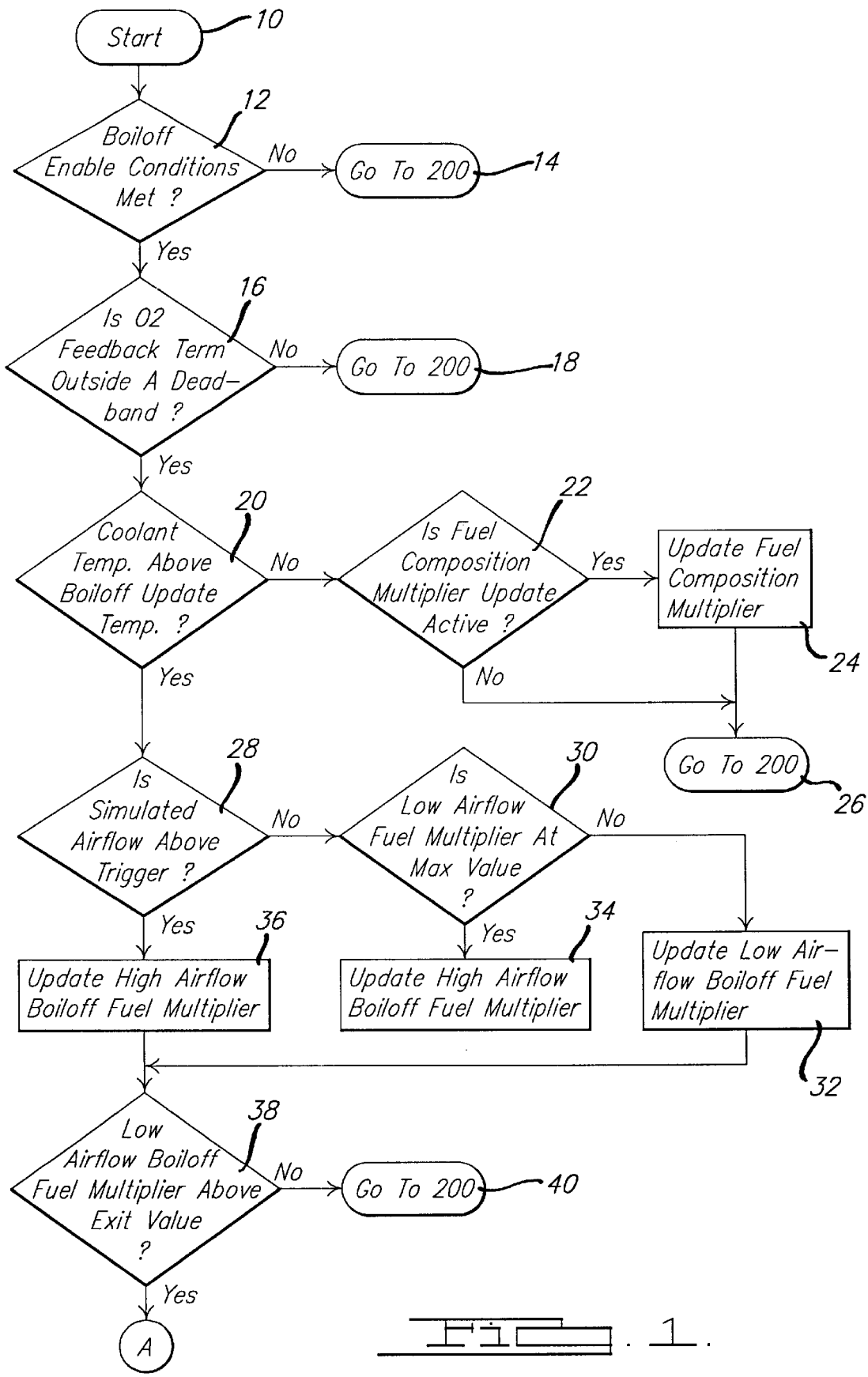
FIGS. 1 and 2 illustrate a flow chart of a method of flexible fuel compensation control for a boil-off condition in a flexible fueled vehicle without a PCV solenoid.

The present invention is directed toward a method of compensating for boil-off alcohol in a flexible fueled vehicle without a PCV solenoid. According to the present invention, greater control of engine fueling parameters is provided during a boil-off condition. Also, the methodology prohibits corruption of the fuel content multiplier determination in a percent alcohol content learning system during a boil-off condition. Additionally, the methodology allows compensation for different levels of boil-off corruption at low and high airflows through the engine. Finally, the methodology enables enhanced boil-off corruption control after an engine restart event. Although the present invention is well suited for operation in conjunction with any number of fuel control systems, a preferred fuel control system is disclosed in U.S. Ser. No. 08/958,411, entitled "Method of Determining a Composition of Fuel in a Flexible Fueled Vehicle" to Nankee II et al. which is incorporated by reference herein.

When cold starting a vehicle that is fueled with ethanol, some of the injected fuel accumulates in the engine oil. This is caused by the inability of charge air to vaporize all of the ethanol at cold operating conditions. Therefore, some of the injected fuel remains in an incombustible liquid state. Additionally, the seal between the rings and the cylinder wall is not strong enough to prevent ethanol leakage during cold cranking and cold operation. As such, the liquid fuel runs down the cylinder walls and into the engine oil.

When the oil temperature reaches about 170° F., the boiling point of ethanol, the ethanol begins to vaporize. The vaporized ethanol is introduced into the engine through the crank case ventilation system. These introduced vapors may cause a high level of fuel corruption until all of the ethanol in the oil is vaporized and ingested into the engine.

If unaccounted for, the ethanol boil-off corruption may cause large errors in the inferred percent alcohol content of the fuel. The inferred percent alcohol content of the fuel is the alcohol content typically determined by an oxygen sensor feedback system. In addition to the errors introduced to the inferred alcohol content, the boil-off corruption can also be sufficient enough to cause idle, start, and drivability deficiencies.

The presence of a boil-off condition is detected by monitoring the engine start coolant temperature, the start battery temperature, the number of crank shaft revolutions counted before a start-to-run transfer, and the alcohol content of the fuel during the drive. If the start coolant and battery temperature are below a threshold value, the number of crankshaft revolutions is greater than a second threshold value, and if at any time during the drive the alcohol content exceeds a third threshold value, the boil-off compensation system of the present invention is activated.

Furthermore, in accordance with the present invention, two modes of boil-off compensation are provided. A first mode of boil-off compensation is used if there is an active inferred alcohol content update. A second mode of boil-off compensation is employed if an inferred alcohol content update is not active.

According to the first mode of boil-off compensation (inferred alcohol content update active), the inferred alcohol content is normally updated below a specified temperature which defines the region where boil-off corruption cannot occur. However, once the predetermined coolant threshold temperature is reached, the inferred alcohol content is stored at its current value to a temporary storage location in the memory of the engine control unit. The stored value is updated periodically to compensate for the ethanol boil-off corruption in engine fueling.

In the second mode of boil-off compensation (inferred alcohol update not active), the inferred alcohol content is stored in the memory of the engine control unit when a boil-off condition is detected. However, the stored value is not updated until a specified coolant temperature is reached. In other words, the inferred alcohol content is updated below the specified coolant temperature when the update is active and held when the update is not active. Also, the temporary storage location of the alcohol content that is used to compensate for boil-off is written to the current value when the corruption is complete if the update is active. However, if the update is not active, the current value is not overwritten when boil-off is complete.

The fuel corruption level due to boil-off is inversely proportional to engine airflow. In fact, small amounts of boil-off only corrupt engine operation at low air flows. As such, the level of boil-off corruption present and the time when corruption is complete may be determined. At high engine airflows, the temporary stored inferred alcohol content is updated to account for high levels of boil-off. This value is therefore used as the high airflow modifier for boil-off. At low airflows, the temporary alcohol content is held and used and an additional fuel modifier is updated and used to compensate for the additional corruption. The low airflow modifier is held at high airflows and not used.

As stated above, the difference in corruption between high and low airflows is used to determine when a boil-off condition is complete. That is, if the low airflow modifier indicates a low corruption level, either the high airflow modifier is not properly updated or the boil-off condition is complete. In other words, if the low airflow modifier reaches its maximum value and the feedback fuel control system still calls for an increase in the fueling, there must be an error in the high airflow modifier. In this case, the high airflow modifier is increased at low airflows. To ensure that the high airflow modifier is correct, the boil-off compensation system will not determine that the boil-off condition is complete until the high airflow modifier is reupdated after the low airflow modifier indicates a low level of boil-off. If the low airflow modifier still indicates a low level of boil-off after the high airflow modifier completely updates, an exit timer is started. When the timer expires, the boil-off compensation system of the present invention is complete.

When the boil-off compensation system is complete, if the system is operating in the first mode of boil-off compensation (inferred alcohol content update active), the temporary stored inferred alcohol content is used again for fuel control. The update is then completed as in the case without boil-off. If the boil-off compensation system is operating in the second mode of boil-off compensation (inferred alcohol content update not active), alcohol fuel control is continued based on the inferred alcohol content value from a previous update.

Figure 2:
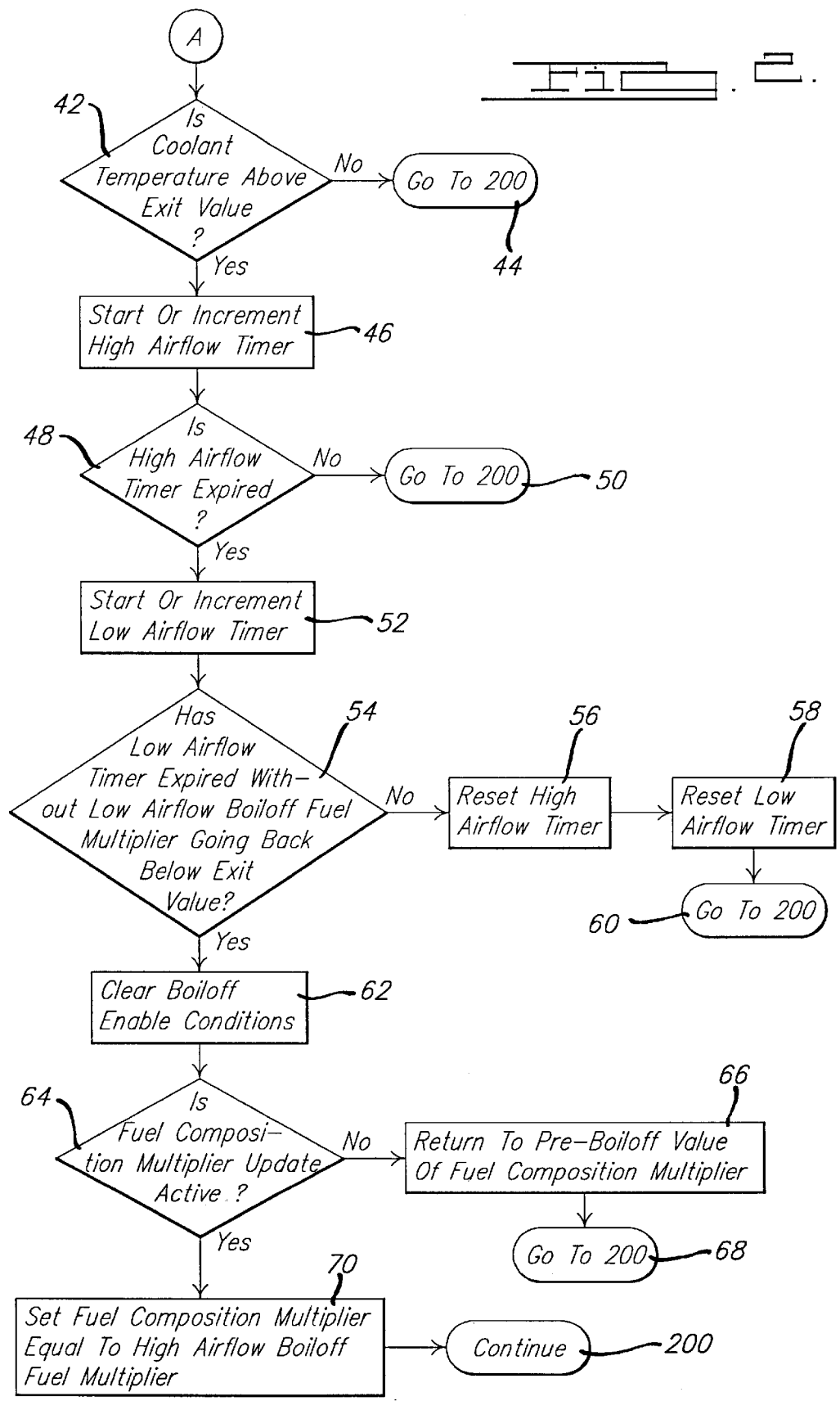

Turning now to the drawing figures, FIGS. 1 and 2 illustrate a flow chart for a method of flexible fuel compensation control of an ethanol boil-off condition in a flexible fueled vehicle without a PCV solenoid. The methodology starts in bubble 10 and advances to decision block 12. In decision block 12, the methodology determines if the boil-off enable conditions (e.g., coolant temperature, battery temperature, etc.) have been met. If not, the methodology advances to bubble 14 where it is forwarded to bubble 200 (FIG. 2) and is returned to start-up bubble 10.

If the boil-off enable conditions are satisfied in decision block 12, the methodology advances to decision block 16. In decision block 16, the methodology determines if the oxygen sensor feedback short term fuel control multiplier is outside of deadband for determining rich or lean operation. If not, the methodology advances to bubble 18 and is forwarded to bubble 200 where it is returned to start-up bubble 10. However, if the oxygen sensor feedback short term fuel control multiplier is outside of deadband at decision block 16, the methodology advances to decision block 20.

In decision block 20, the methodology determines if the engine coolant temperature is above a boil-off update temperature. If not, the methodology advances to decision block 22 and determines if the fuel composition multiplier update is active. If the fuel composition multiplier update is active, the methodology advances to block 24 and updates the fuel composition multiplier. If the fuel composition multiplier update is not active at decision block 22, or if the fuel composition multiplier has been updated at block 24, the methodology advances to bubble 26 and is forwarded to bubble 200 where it is returned to start-up bubble 10.

Referring again to decision block 20, if the coolant temperature is above the boil-off update temperature, the methodology advances to decision block 28. In decision block 28, the methodology determines if the calculated airflow through the engine is above a pre-selected threshold. If not, the methodology advances to decision block 30.

In decision block 30, the methodology determines if the low airflow boil-off fuel multiplier is at its maximum value. If not, the methodology advances to block 32 and updates the low airflow boil-off fuel multiplier. However, if the low airflow boil-off fuel multiplier is at its maximum value at decision 30, the methodology advances to block 34. In block 34, the methodology updates the high airflow boil-off multiplier.

Referring again to decision block 28, if the calculated airflow is above the pre-selected threshold, the methodology advances to block 36. In block 36, the methodology updates the high airflow boil-off fuel multiplier. After the methodology updates the high airflow boil-off fuel multiplier in block 36 or 34, or updates the low airflow boil-off fuel multiplier in block 32, the methodology advances to decision block 38.

In decision block 38, the methodology determines if the low airflow boil-off fuel multiplier is above an exit value. If not, the methodology advances to bubble 40 where it is forwarded to bubble 200 and returned to start-up bubble 10. However, if the low airflow boil-off fuel multiplier is above the exit value, the methodology advances through connector A to decision block 42 (FIG. 2).

In decision block 42 the methodology determines if the coolant temperature is above the exit value. If not, the methodology advances to bubble 44 where it is advanced to bubble 200 and returned to start-up bubble 10. If the coolant temperature is above the exit value at decision block 42, the methodology advances to block 46 and starts or increments a high airflow timer. From block 46, the methodology advances to decision block 48 and determines if the high airflow timer has expired. If not, the methodology advances to bubble 50 where it is forwarded to bubble 200 and returned to start-up bubble 10.

If the high airflow timer has expired at decision block 48, the methodology advances to block 52. In block 52, the methodology starts or increments a low airflow timer. From block 52 the methodology advances to decision block 54 and determines if the low airflow timer has expired without the low airflow blow-off fuel multiplier proceeding below the exit value.

If not, the methodology advances to block 56 and resets the high airflow timer. After resetting the high airflow timer at block 56, the methodology advances to block 58 and resets the low airflow timer. After resetting the low airflow timer at block 58, the methodology advances to bubble 60 where it is forwarded to bubble 200 and returned to start-up bubble 10.

Referring again to decision block 54, if the low airflow timer has expired without the low airflow boil-off fuel multiplier proceeding below the exit value, the methodology advances to block 62. In block 62, the methodology clears the boil-off enable conditions. From block 62, the methodology advances to decision block 64 and determines if the fuel composition multiplier update is active.

If the fuel composition multiplier update is not active at decision block 64 the methodology advances to block 66 and returns the fuel composition multiplier to its pre-boil-off value. From block 66, the methodology advances to bubble 68 where it is forwarded to bubble 200 and returned to start-up bubble 10.

If the fuel composition multiplier update is active at decision block 64, the methodology advances to block 70. In block 70, the methodology sets the fuel composition multiplier equal to the high airflow boil-off fuel multiplier. After setting the fuel composition multiplier equal to the high airflow boil-off fuel multiplier at block 70, the methodology advances to bubble 200 where it is returned to start-up bubble 10.

Figure 3:
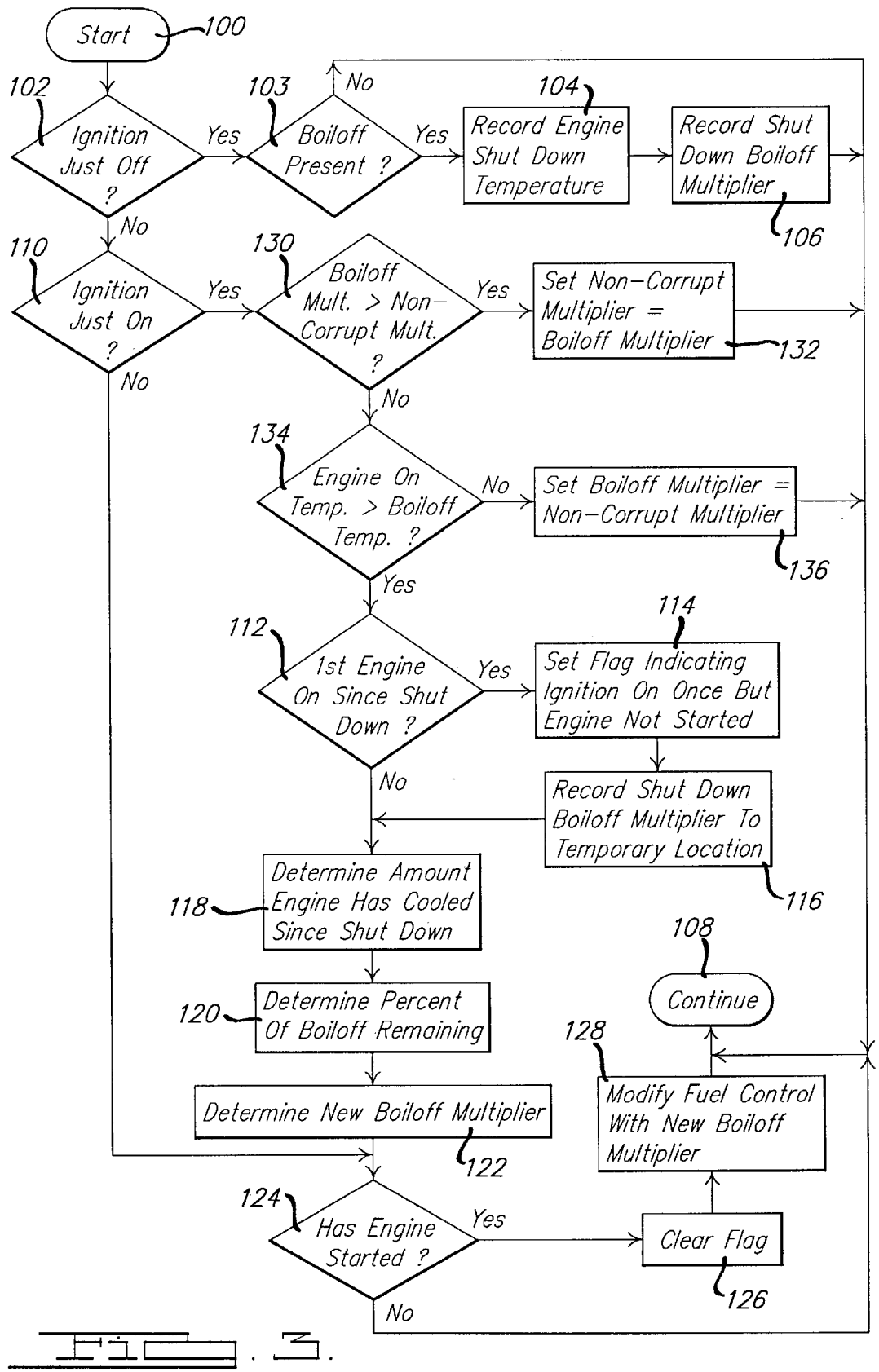
FIG. 3 illustrates a flow chart at a method of flexible fuel compensation control for a boil-off condition after a restart.

Turning now to FIG. 3, a methodology is illustrated for accounting for the variable corruption levels encountered when a vehicle is shut down during a boil-off condition, allowed to rest for some period of time, and then restarted. Under these circumstances, the engine conditions change and, therefore, the fuel compensation for accommodating boil-off corruption is tailored. To accomplish this, the level of boil-off corruption at engine shut down is recorded. When the vehicle is restarted, the current engine conditions and the amount the engine conditions have changed since shut down are used to determine how much boil-off corruption is still present. The boil-off corruption fuel multipliers are then adjusted to correctly compensate for the determined level of boil-off corruption.

Still referring to FIG. 3, the methodology starts at bubble 100 and falls through to decision block 102. In decision block 102, the methodology determines if the ignition has just been turned off. If so, the methodology advances to decision block 103. In decision block 103, the methodology determines if a boil-off condition is present at shut down. If so, the methodology continues to block 104 and records the shut down temperature of the engine. From block 104 the methodology advances to block 106 and records the value of the shut down boil-off fuel multiplier. From block 106, or from decision block 103 if the engine is not experiencing a boil-off condition at shut down, the methodology advances to bubble 108 and exits the subroutine pending a subsequent execution thereof, for instance, at the next engine on event. From the foregoing, it can be appreciated that the engine temperature and boil-off fuel multiplier are only recorded when the engine is shut down if boil-off corruption is present. In this regard, it should be noted that although the engine temperature may be retrieved by the engine control unit at various times including shut down for other vehicle applications, the methodology of the present invention only records the engine temperature at shut down if boil-off is present.

Referring again to decision block 102, if the ignition was not just turned off, the methodology advances to decision block 110. At decision block 110, the methodology determines if the ignition was just turned on. If so, the methodology advances to decision block 130. In decision block 130 the methodology compares the recorded boil-off fuel multiplier to the non-corrupted (i.e., non-boil-off) alcohol fuel multiplier. If the boil-off fuel multiplier is greater than the non-corrupted alcohol fuel multiplier in decision block 130, the methodology advances to block 132 and increases the non-corrupted alcohol fuel multiplier to the same value as the boil-off fuel multiplier. This is done since boil-off corruption can only cause the boil-off fuel multiplier to be less than the non-corrupted fuel multiplier. If the boil-off fuel multiplier is greater than the non-corrupted fuel multiplier and is therefore calling for the addition of fuel over the amount called for by the non-corrupted fuel multiplier, then the methodology assumes that the non-corrupted fuel multiplier is in error and that it should be increased at least to the level of the boil-off fuel multiplier. From block 132 the methodology advances to bubble 108 and exits the subroutine pending a subsequent execution thereof.

Referring again to decision block 130, if the boil-off multiplier is less than or equal to the non-corrupted fuel multiplier, the methodology advances to decision block 134. In decision block 134, the methodology compares the ignition on engine temperature to the boil off temperature threshold. If the ignition on engine temperature is not high enough for boil-off corruption to occur at decision block 134, the methodology advances to block 136. In block 136 the value of the boil-off fuel multiplier is increased to the value of the non-corrupted fuel multiplier. From block 136, the methodology continues to bubble 108 where it exits the subroutine pending a subsequent execution thereof.

However, if the engine temperature is high enough for boil-off corruption to occur at decision block 134, the methodology advances to decision block 112 where the boil-off fuel multiplier is modified based on the engine conditions at the ignition on event. In decision block 112, the methodology determines if this engine on event is the first time the ignition has been turned on since the last shut down. If so, the methodology advances to block 114. In block 114, the methodology sets a flag to indicate that the ignition has been turned on once but that the engine has not yet started. From block 114, the methodology advances to block 116.

In block 116, the methodology records the shut down boil-off fuel multiplier value (from block 106) to a temporary location such as the RAM of the engine control unit. After recording the shutdown boil-off fuel multiplier in block 116, or if this ignition on event is not the first time the ignition has been turned on since the last shut down at decision block 112, the methodology advances to block 118. In block 118, the methodology determines how much the engine has cooled since the last time it was shut down by calculating the difference between the ignition on engine temperature and the recorded shut down engine temperature (from block 104).

After determining how much the engine has cooled down in block 118, the methodology advances to block 120. In block 120, the methodology determines the amount of boil-off corruption remaining in the engine based on the temperature of the engine at the time the ignition was turned on and the amount that the engine has cooled. Preferably, this is accomplished by looking up the value of the remaining boil-off corruption in a table having current engine temperature as one input parameter and change in engine temperature as the other input parameter. The look-up table is preferably generated in a laboratory setting by running a series of tests over various engine temperatures and engine cooling scenarios and measuring the remaining boil off corruption for each. As described below, after calculating the amount of boil-off corruption remaining, this value is used to increase the boil-off corruption multiplier toward the non-corrupted fuel multiplier value. The new boil-off fuel multiplier is then used for fuel control any time the engine temperature is high enough for boil-off corruption to occur until the alcohol in the crankcase has completely evaporated and the boil-off corruption is determined to be gone.

Referring again to block 120, after looking up the amount of boil-off remaining, the methodology advances to block 122. In block 122, the methodology uses the determined amount of boil-off corruption remaining and the non-corrupted (i.e., non-boil-off) fuel control multiplier to calculate a new boil-off corruption fuel multiplier value. Preferably, the new boil-off multiplier is determined by subtracting the recorded boil-off multiplier value from the non-corrupted multiplier value to yield an alcohol content difference value. This alcohol content difference value is then multiplied by the percent value of the remaining boil-off corruption from the table. This yields a change in boil-off multiplier value. The change in boil-off multiplier value is then added to the recorded boil-off multiplier value to yield the new boil-off multiplier value. After determining the new boil-off corruption fuel multiplier in block 122, or if the ignition was not just turned on at decision block 110, the methodology advances to decision block 124.

In decision block 124, the methodology determines if the engine has started. If not, the methodology advances to bubble 108 and exits the subroutine pending a subsequent execution thereof. However, if the engine has just started in decision block 124, the methodology continues to block 126. In block 126, the methodology clears the flag that indicates that the ignition has been turned on once but that the engine has not yet been started. From block 126, the methodology continues to block 128. In block 128, the methodology uses the new boil-off corruption multiplier determined at block 122 to modify the fuel control of the engine such that stoichiometric operation ensues.

According to the above, the present invention provides a system for compensating for boil-off corruption in a flexible fueled vehicle. The system employs a first mode of boil-off compensation if an inferred alcohol content multiplier update function is active and a second mode of boil-off compensation if the inferred alcohol content multiplier update function is inactive. The system also employs different routines for compensating for boil-off corruption at high and low airflows.

Further, the present invention provides a system for compensating for boil-off corruption after an engine restart event. Based on the engine temperature at the restart and the amount the engine cooled since the last shutdown event, the amount of boil-off corruption remaining is calculated. A new boil-off corruption fuel multiplier is determined based on the amount of boil-off corruption remaining. The new boil-off corruption fuel multiplier is then used to control fueling until the boil-off condition ceases.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling fuel delivery to an engine comprising:

determining an amount said engine has cooled since a shut-off event;

determining an amount of boil-off corruption remaining after an ignition on event according to said amount said engine has cooled;

determining a boil-off corruption fuel modifier value according to said amount of boil-off corruption remaining; and modifying said fuel delivery according to said boil-off corruption fuel modifier value.

2. The method of claim 1 wherein said step of determining said amount said engine has cooled further comprises comparing a first temperature of said engine to a second temperature of said engine.

3. The method of claim 2 wherein said first temperature further comprises a temperature of said engine at said shut off event.

4. The method of claim 3 wherein said first temperature is only recorded at said shut off event if a boil-off condition exists.

5. The method of claim 2 wherein said second temperature further comprises a temperature of said engine at said ignition on event.

6. The method of claim 1 wherein said step of determining said amount of boil-off corruption remaining further comprises looking up said amount of boil-off corruption remaining in a table using said amount said engine has cooled as a first input and a temperature of said engine as a second input.

7. The method of claim 6 wherein said temperature of said engine further comprises a temperature of said engine at an ignition on event.

8. The method of claim 1 wherein said step of determining a boil-off corruption fuel modifier value further comprises:

subtracting a previous boil-off fuel multiplier value from a non-corrupted fuel multiplier value to yield a difference value;

multiplying said difference value by a percent value of said amount of boil-off corruption remaining to yield a change value; and adding said change value to said previous boil-off fuel multiplier value to yield said boil-off corruption fuel modifier value.

9. The method of claim 8 wherein said previous boil-off fuel multiplier value corresponds to an amount of boil-off corruption present when said engine is shut off.

10. The method of claim 8 wherein said non-corrupted fuel multiplier value corresponds to an amount of alcohol present in a fuel delivered to said engine.

11. A method of controlling combustion parameters of an internal combustion engine in a flexible fueled vehicle comprising:

detecting an engine off event;

recording a first engine temperature at said engine off event if a boil-off condition exists;

recording a first boil-off corruption fuel multiplier value at said engine off event;

detecting an ignition on event;

recording a second engine temperature at said ignition on event;

determining a difference between said first and second temperatures;

determining an amount of boil-off corruption remaining after said engine on event according to said difference between said first and second temperatures;

determining a second boil-off corruption fuel multiplier according to said amount of boil-off corruption remaining; and setting said combustion parameters for compensating for boil-off corruption after said ignition on event according to said second boil-off corruption fuel multiplier.

12. The method of claim 11 wherein said step of determining said amount of boil-off corruption remaining after said ignition on event further corresponds to said second engine temperature.

13. The method of claim 12 wherein said amount of boil-off corruption remaining after said ignition on event is obtained from a look-up table using said second engine temperature and said difference between said first and second temperatures as inputs.

14. The method of claim 11 wherein said step of determining said second boil-off corruption fuel multiplier further corresponds to a non-corrupted fuel control multiplier.

15. The method of claim 14 wherein said second boil-off corruption fuel multiplier is obtained by:

subtracting said first boil-off corruption fuel multiplier from said non-corrupted fuel control multiplier to yield a difference value;

multiplying said difference value by a percent value of said amount of boil-off corruption remaining after said engine on event to yield a change value; and adding said change value to said first boil-off corruption fuel multiplier.

16. The method of claim 11 further comprising:

increasing said non-corrupted fuel control multiplier to said first boil-off corruption fuel multiplier value if said first boil-off corruption fuel multiplier value is greater than said non-corrupted fuel control multiplier at said ignition on event.

17. The method of claim 11 further comprising:

increasing said first boil-off corruption fuel multiplier value to a value of said non-corrupted fuel control multiplier if said non-corrupted fuel control multiplier is greater than said first boil-off corruption fuel multiplier value and said second engine temperature is not high enough for boil-off corruption to occur at said ignition on event.

18. The method of claim 11 further comprising:

determining that said non-corrupted fuel control multiplier is greater than said first boil-off corruption fuel multiplier value and said second engine temperature is high enough for boil-off corruption to occur at said ignition on event prior to determining said second boil-off corruption fuel multiplier.

19. The method of claim 11 wherein said step of determining said second boil-off corruption fuel multiplier is only done after a first ignition on event.

* * * * *

UNITED STATES PATENT AND TRADEMARK OFFICE
CERTIFICATE OF CORRECTION

PATENT NO : 6,000,367
DATED : December 14, 1999
INVENTOR(S) : Huff et al.

It is certified that error appears in the above-identified patent and that said Letters Patent is hereby corrected as shown below:

On the title page, item [73]:

In the ASSIGNEE Section, please change "DimlerChrysler" to --DaimlerChrysler--.

Signed and Sealed this

Eleventh Day of July, 2000

*Attest:*

Q. TODD DICKINSON

*Attesting Officer*   *Director of Patents and Trademarks*